March 4, 1952     A. G. GROSS     2,587,996
ABSORPTION REFRIGERATION Filed July 5, 1943     3 Sheets-Sheet 1

Fig.1

INVENTOR.
Alfred G. Gross
BY
Harry S. Dumars
Attorney.

March 4, 1952 A. G. GROSS 2,587,996
ABSORPTION REFRIGERATION
Filed July 5, 1943 3 Sheets-Sheet 2

INVENTOR
Alfred G. Gross
BY Harry S. Dunasse
Attorney.

March 4, 1952   A. G. GROSS   2,587,996
ABSORPTION REFRIGERATION
Filed July 5, 1943   3 Sheets-Sheet 3

Fig. 4

INVENTOR.
Alfred G. Gross
BY
Harry S. ...
Attorney.

Patented Mar. 4, 1952

2,587,996

UNITED STATES PATENT OFFICE 2,587,996

ABSORPTION REFRIGERATION

Alfred G. Gross, Wilmette, Ill., assignor to The Hoover Company, North Canton, Ohio, a corporation of Ohio Application July 5, 1943, Serial No. 493,491

21 Claims. (Cl. 62—5)

This invention relates to refrigeration and more particularly to two intermittent absorption refrigerating units operating alternately on the generation-condensation and absorption-evaporation periods and utilizing a dry salt such as strontium chloride as the absorbent.

In such machines it is necessary to prevent the refrigerant, in liquid form, from contacting the solid absorbent because the liquid refrigerant would destroy the absorbing qualities of the absorbent.

It is therefore an object of this invention to provide two intermittent absorption refrigerating units in which it is impossible for the refrigerant, in liquid form, to contact the solid absorbent.

It is another object of this invention to provide two intermittent absorption refrigerating units operating alternately on the generation-condensation and absorption-evaporation periods in which the condensers are positioned below the generator-absorbers so that any refrigerant, which invariably condenses in the conduits connecting the condenser and the generator-absorbers, cannot flow backwardly to the generator-absorbers and come into contact with the solid absorbent therein and in which the condensers and generator-absorbers are cooled by a single cooling circuit having one heat rejecting element.

Prior attempts have been made to provide an indirect cooling circuit for intermittent absorption machines in open communication with the interior of the refrigerating machine and utilizing a portion of the refrigerant as the fluid medium for the indirect cooling circuit, but such attempts have been unsuccessful because the fluid in the indirect cooling circuits was vaporized when the vapor pressure was reduced during the evaporation-absorption period of operation which prevented the refrigerant in the evaporator from being evaporated.

This came about by reason of the fact that no provision was made for shielding the liquid in the indirect cooling circuit from the generator-absorbers during the absorption-evaporation period and the liquid in the indirect cooling circuit being warm compared to the refrigerant in the evaporator was evaporated before the liquid refrigerant in the evaporator because both were subjected to the lowered vapor pressure in the generator-absorber during the absorption period of operation.

According to one aspect of the present invention, an indirect cooling circuit for an intermittent absorption refrigerating machine is provided in open communication with the interior of the machine which prevents the vaporization of the liquid medium in the indirect cooling circuit by the lowering of the vapor pressure in the generator-absorber. The above result is produced by so arranging the refrigerating unit and the indirect cooling circuit that the liquid medium in the indirect cooling circuit is shielded from the lowered vapor pressure in the generator-absorber during the absorption period of operation.

It is another object of this invention to provide two intermittent absorption refrigerating units with a single heat rejecting element for both condensers and generator-absorbers so arranged that the heat rejecting element may be arranged in a vertical air cooling flue extending upwardly along the rear of a domestic refrigerator cabinet and the generator-absorbers and condensers may be arranged in an apparatus compartment beneath the food storage compartment.

Other objects and advantages of this invention will become apparent when taken in connection with the accompanying drawings in which.

Figure 1:
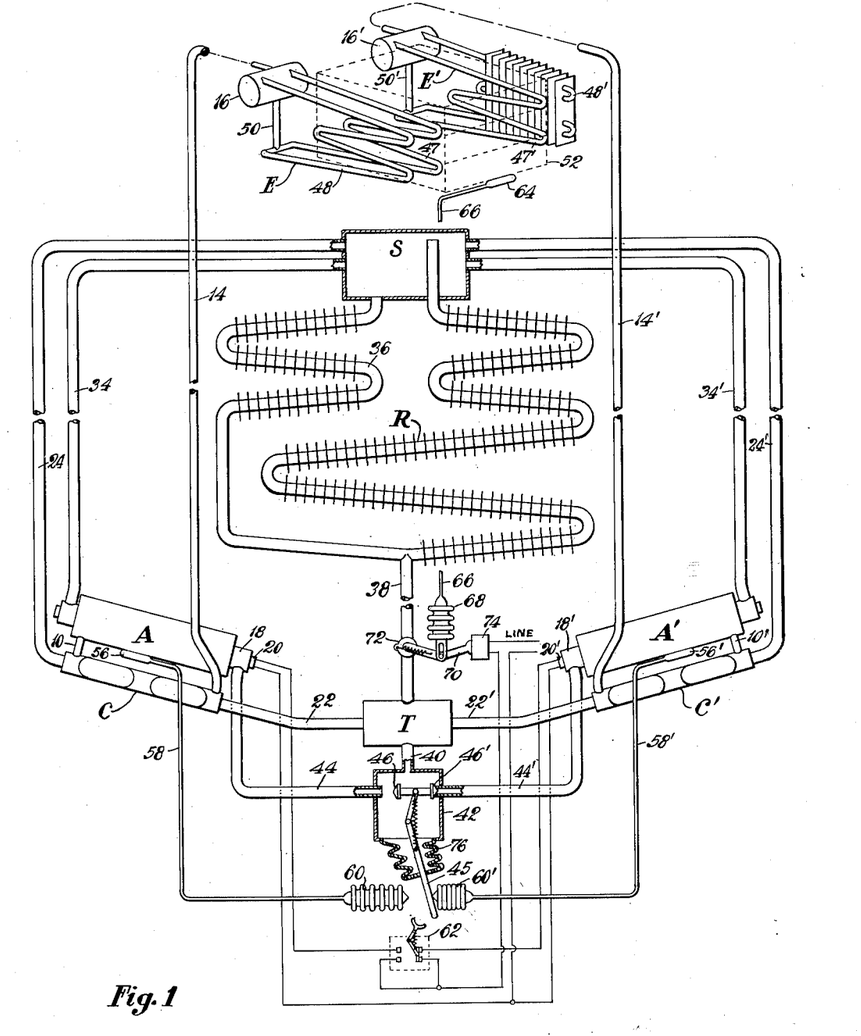
Figure 1 is a diagrammatic representation of one form of the apparatus according to this invention in which two independent intermittent absorption machines are cooled by a single indirect cooling circuit.

Referring to Figure 1 of the drawings, A, A' represent two generator-absorbers, C, C' two primary condensers, and E, E' two evaporators. The absorbent-receiving chambers of the generator-absorbers A, A' are connected to condensers C, C' by conduits 10, 10'. The condensers C, C' have a downwardly inclined slope throughout and are connected by vertically extending conduits 14, 14' to receiving vessels 16, 16' which form a part of the evaporators E, E'. The construction and operation of the evaporators E, E' will be described in more detail hereinafter.

Each generator-absorber A, A' has an absorbent-receiving chamber formed by the outer cylindrical walls of the vessels A, A', the outer cylindrical walls of the heat exchange vessels 18, 18' and end closures (not shown) welded to the cylindrical walls. The annular chambers so formed are provided with suitable trays (not shown) having openings through the walls thereof and being welded to the inner and outer cylindrical walls of the annular chambers. These trays support any well known solid absorbent such as strontium chloride which will absorb the refrigerant vapor such as ammonia, which solid absorbent may be charged into the absorption chamber in any manner well known to the art.

The heat exchange vessels 18, 18' are formed of inner and outer concentric cylindrical walls having end closures welded thereto and form annular receiving chambers for an indirect cooling fluid of the indirect cooling circuit for the generator-absorbers A, A' and the condensers C, C', the construction and operation of which will be described in more detail hereinafter. In the cylindrical space formed by the inner cylindrical walls of the heat exchange vessels 18, 18' are electric heating cartridges 20, 20' of any suitable construction known to the art.

The generator-absorbers A, A' are arranged in an inclined position with the condensers C, C' also arranged in an inclined position immediately below the generator-absorbers A, A'. The condensers C, C' are in effect concentric tube heat exchangers, the outer passage of which receives vapor from the generator-absorbers A, A' and the inner passage of which forms a passage for the cooling fluid of the indirect cooling circuit for the generator-absorbers A, A' and the condensers C, C'.

The lower ends of the inner passages forming the condensers C, C' are connected by conduits 22, 22' to a liquid reservoir T while the upper ends are connected by vapor lift conduits 24, 24' to a gas separation chamber S positioned above both the generator-absorbers A, A' and the condensers C, C'.

The upper ends of the annular heat exchange chambers 18, 18' of the generator-absorbers A, A' are connected by conduits 34, 34', which also are vapor lift conduits, to the gas separation chamber S. A secondary condenser R is positioned immediately below the gas separation chamber S, the inlet conduit of which extends upwardly into the gas separation chamber S to near the top thereof. Leading from the bottom of the gas separation chamber S is a liquid cooling coil 36 which joins the conduit of the secondary condenser R at the conduit 38 which leads to the reservoir T. A conduit 40 leads from the reservoir T to the valve chamber 42 which is connected by conduit 44, 44' to the lower end of the heat exchange chambers 18, 18' of the generator-absorbers A, A'. The valves 46, 46' are designed to be operated by a snap acting device 45 of any suitable construction.

Each of the evaporators E, E' consists of two coiled conduits 47, 47' and 48, 48' joined to vertically extending conduits 50, 50' extending downwardly from the receiving vessels 16, 16' and connected at their upper ends to the upper portions of the receiving vessels 16, 16'.

The coiled conduits 47, 47' are in thermal contact with the walls of a freezing chamber 52 while the coiled conduits 48, 48' have heat exchange fins thereon for the purpose of cooling the food storage compartment of a domestic refrigerator.

Thermostatic bulbs 56, 56' contact the outer surfaces of the generator-absorbers A, A' and are connected by capillary tubes 58, 58' to bellows 60, 60' which upon expansion and contraction are adapted to operate the snap acting device 45. The bulbs 56, 56', tubes 58, 58' and bellows 60, 60' contain a suitable vaporizable fluid so that the bellows 60, 60' will expand and contract upon variations in temperature of the bulbs 56, 56' as is well known in the art. A snap acting switch 62 of any well known construction is positioned to be actuated by the snap acting device 45.

A thermostatic bulb 64 is positioned in contact with the freezing chamber 52 and is responsive to the temperature of that chamber. Bulb 64 is connected by a capillary tube 66 to a bellows 68. Bulb 64, tube 66 and bellows 68 contain a suitable vaporizable fluid so that the bellows 68 will expand and contract upon variations in the temperature of the low temperature chamber 52, as is well known in the art. The bellows 68 upon expansion and contraction is set to actuate a snap acting device 70 which in turn operates the valve 72 in the conduit 38 and an electric switch 74.

The indirect cooling circuit for the generator-absorbers A, A' and the condensers C, C' which are formed by the heat exchange vessels 18, 18', conduits 34, 34', conduits 22, 22', the inner passage of the heat exchanger forming the condenser C, C', conduits 24, 24', gas separation vessel S, secondary condenser R, liquid cooling coil 36, conduit 38, reservoir T, conduit 40, valve chamber 42 and conduits 44, 44' is suitably charged with a vaporizable liquid such as methyl chloride. Depending upon the cooling liquid selected, the pressure within the indirect cooling circuit need not be high so that the snap acting device 45 may be led into the interior of the valve chamber 42 through a suitable flexible joint 76.

Figure 2:
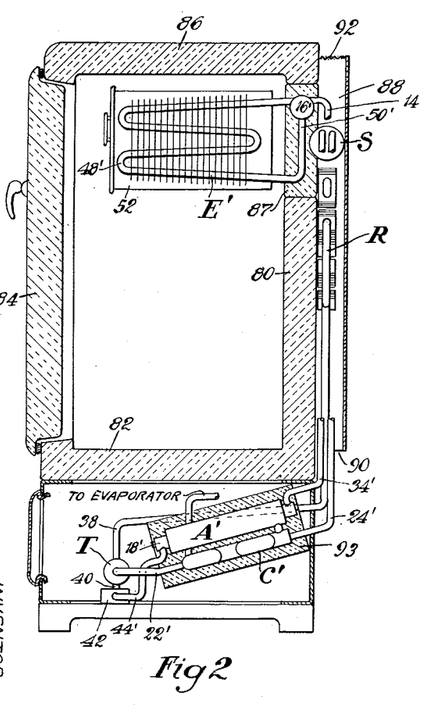
Figure 2 shows a vertical cross sectional view of a domestic refrigerator cabinet with the unit of Figure 1 associated therewith.
Figure 3:
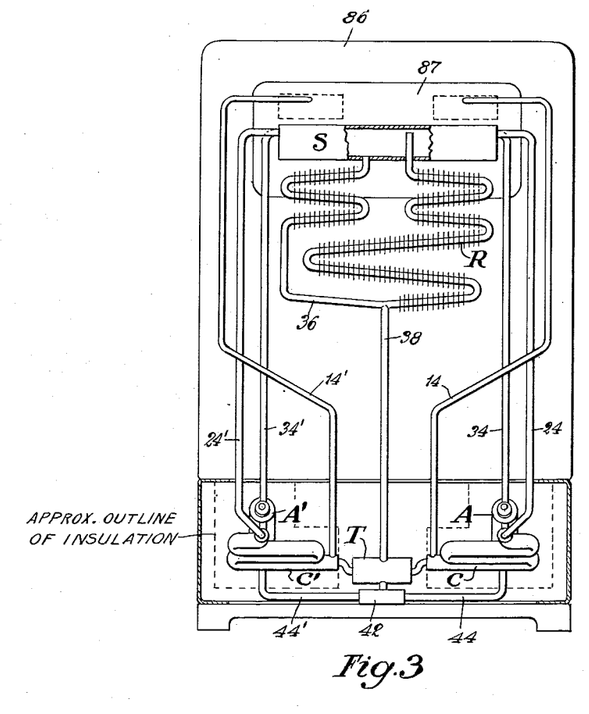
Figure 3 shows a rear view of the absorption refrigerating apparatus of Figure 1 as it appears when assembled with a domestic refrigerator cabinet.

The refrigerating apparatus just described and shown diagrammatically in Figure 1 is adapted to be arranged so as to be mounted in a domestic refrigerator cabinet, as shown in Figures 2 and 3. The cabinet comprises a back insulated wall 80, lower insulated wall 82, front access door 84 and the top insulated wall 86. At the rear of the cabinet is provided a flue 88 for the circulation of air over the heat rejecting parts of the apparatus. An opening 90 at the bottom of the flue 88 provides for the entrance of cooling air and a screen 92 at its top provides for its exit. The generator-absorbers A, A' and the condensers C, C' are imbedded in insulation 93 and are arranged in an inclined position at the opposite sides of the apparatus compartment formed below the lower insulated wall 82 of the cabinet. The secondary condenser R and the liquid cooling coil 36 are arranged crosswise of the cabinet air flue 88 to be cooled by air flowing upwardly therethrough while the gas separation chamber S is positioned in the flue 88 immediately above the secondary condenser R and the liquid cooling coil 36. The liquid receiving vessels 16, 16' and the downwardly extending conduits 50, 50' of the evaporators E, E' are imbedded in a removable closure 87 of insulating material for an opening in the rear of the cabinet arranged to provide for the assembly of the evaporators E, E' into the interior of the food storage compartment so that the entire apparatus can be assembled to the cabinet as a unit.

As shown in Figure 1, the valve 72 is open and the switch 74 is closed. The switch 62 is set so that electricity will be conducted to the heating cartridge 20' of the generator-absorber A' which will be heated. The bulb 60' is contracted and the bulb 60 is expanded by previous heating of the generator-absorber A as will be described hereinafter. Thus the snap acting device 45 will be positioned to the right, the valve 46' will be closed and the valve 46 open.

With the control set as in Figure 1, the heating of the generator-absorber A' will drive refrigerant vapor from the solid absorbent contained therein. The refrigerant vapor thus driven off will pass by the conduit 10' to the condenser C' where it will be condensed and the heat of condensation transferred to the auxiliary cooling medium in the indirect cooling circuit as will be explained hereinafter. The condenser C' has a continuous downward slope throughout and the condensed refrigerant will be forced upwardly through the conduit 14' into the receiving vessel 16' by the pressure built up in the generator-absorber A'. This action will continue until all the ammonia in the generator-absorber A' has been driven off and the evaporator E' has been completely charged with liquid refrigerant. Any vapor which may condense in the conduit 10' will flow with the vapor to the condenser C' and cannot return to the generator-absorber A' to deteriorate the solid absorbent therein.

During the heating of the generator-absorber A' the auxiliary cooling liquid in the annular heat exchange chamber 18' of the generator-absorber A' will quickly vaporize and the liquid in the conduit 34' will be raised by vapor lift action in the gas separation chamber S, emptying the heat exchange chamber 18' of liquid cooling medium. This liquid auxiliary cooling fluid cannot return to the generator-absorber A' at this time because the valve 46' is closed.

In the meantime absorption of refrigerant vapor is taking place in the generator-absorber A in a manner which will be described in connection with the absorption which takes place in the generator-absorber A' when the control operates to shift the generator-absorber A' from the generating period to the absorption period and the generator-absorber A from the absorption period to the generating period.

The heat of condensation of the refrigerant vapor condensed in the condenser C' is transferred to the auxiliary cooling fluid in the inner passageway forming the heat exchanger of the condenser C' which will vaporize a portion of the auxiliary cooling fluid therein and this vapor will act as a vapor lift pump to circulate positively the auxiliary cooling fluid upwardly through the conduit 24' into the gas separation chamber S. The vapor so formed will separate from the liquid in chamber S and flow through the auxiliary condenser R, where it will be condensed, while the liquid will flow through the liquid cooling coil 36 and both the cooled liquid and the condensed vapor will flow by conduit 38 into the reservoir T to be returned by conduit 22' to the inner passage of the heat exchanger of the condenser C' for further cooling action. In this manner the heat of condensation of the refrigerant vapor condensed in the condenser C' is transferred to the cooling air flowing over the fins of the secondary condenser R and the liquid cooler 36. At the same time heat is being transferred to the cooling air from the generator-absorber A as will be described hereinafter.

When sufficient refrigerant has been driven from the absorbent in the generator-absorber A' heat from the heating cartridge 20' will no longer be utilized in driving refrigerant vapor from the absorbent in the generator-absorber A' and it will rise in temperature. This rise in temperature will be quite abrupt even though the heat supplied to the generator-absorber A' remains constant. This comes about by reason of the fact that while refrigerant is being driven from the solid absorbent, the heat supplied thereto is being utilized to vaporize the refrigerant and when the refrigerant is vaporized, the heat supplied quickly raises the temperature of the generator-absorber to a much higher value. This will cause the liquid in the bulb 56' to vaporize whereby the bellows 60' will be expanded. At this time the bellows 60 will be in contracted position because absorption is taking place in the generator-absorber A and the fluid in the bulb 56 will be condensed. Expansion of the bellows 60' will push the snap-acting device to the left which will operate the switch 62 to de-energize the heating element 20' and to energize the heating element 20. At the same time it will operate to open the valve 46' and to close the valve 46.

The indirect cooling system is charged with sufficient auxiliary cooling medium so that it always contains auxiliary cooling medium in liquid form at a level above the generator-absorbers A—A', When the control operates to open the valve 46', the liquid in the indirect cooling system will be dumped into the annular heat exchange vessel 18' of the generator-absorber A'. Since the generator-absorber A' is hot at this time, the auxiliary cooling liquid will be quickly vaporized by the transfer of heat of vaporization of the auxiliary liquid from the generator-absorber A' and it in turn will thus be quickly cooled. The vapor formed in the heat exchange vessel 18' will act as a vapor lift pump to raise the auxiliary cooling liquid through the conduit 34' into the gas separation chamber S. The vapor will separate from the liquid and pass to the auxiliary condenser R where it is condensed while the liquid will flow through the liquid cooling coil 36 to the conduit 38, where it will join the condensed vapor, flow through reservoir T, valve chamber 42, the open valve 46' and conduit 44', back to the heat exchange vessel 18'. Thus a positive circulation of liquid cooling medium takes place through the above-described circuit whereby the generator-absorber A' is quickly cooled. The cooling of the generator-absorber A' will reduce the pressure therein and the solid absorbent contained therein will begin to absorb refrigerant vapor and vaporization of the liquid refrigerant in the evaporator E' will begin.

The coils 47' and 48' are in open communication with the receiver 16' so that the vapor pressure of the refrigerant in each coil will be the same. Since the receiver vessel 16' and the downwardly extending conduit 50' are embedded in insulation 87, the coiled conduit 47' is in heat exchange with the freezing vessel 52 and the coiled conduit 48' in heat exchange with the air in the food storage compartment, no refrigerant will be vaporized in the conduit 50' and considerable evaporation will take place in the coiled conduits 47' and 48' as the vapor pressure in the vessel 16' is reduced.

This will cause a rapid ebullition of refrigerant vapor in the upwardly extending coiled conduits 47' and 48' and a positive circulation of liquid refrigerant will take place from the vessel 16', downwardly through the conduit 50' and upwardly through the coiled conduits 47' and 48' and back to the vessel 16'. This circulation takes place by the lifting action of the refrigerant evaporated in the coiled conduits 47' and 48' and it is known in the art as a vapor lift pump action. Thus the more refrigerant vapor that is evaporated in the conduits 47' and 48' the more rapid will be the circulation of the liquid refrigerant. Furthermore, the greater the refrigerant load that is placed upon the coils 47' and 48', the greater will be the amount of heat which will be transferred to the liquid refrigerant in the coiled conduits 47' and 48'. This will produce a greater or lesser evaporation of refrigerant in the conduits 47' and 48' depending upon the refrigeration load placed upon those coils.

During this period the temperature of the coils 47' and 48' will be substantially the same because the vapor pressure on their interior will be the same and each contains liquid refrigerant. However, the temperature of the chamber 52 can be maintained considerably lower than the temperature of the coiled conduit 48' by altering the characteristics of the heat conducting path from the air in the food storage compartment to the coiled conduit 48'.

The circulation of liquid refrigerant will continue in both conduits 47' and 48' until the control bulb 56 and bellows 60 operate to switch the generator-absorber A' back to the generating period or the bulb 64 and bellows 68 operate to stop the entire apparatus, as will be later described.

As evaporation and absorption is taking place in the evaporator E' and the generator-absorber A', the generator-absorber A is being heated by the heating element 20. Vapor is being driven from the solid absorbent in the generator-absorber A, condensed in the condenser C and collected in the evaporator B as previously described in connection with the ebullition of vapor from the generator-absorber A'.

By the time that substantially all the liquid refrigerant in the evaporator E' is evaporated, the refrigerant vapor will be driven from the solid absorbent in the generator-absorber A. This will cause the medium in bulb 56 to expand the bellows 60 in the manner previously described in connection with the generator-absorber A'. Snap-acting device 45 will be moved to the right as viewed in Figure 1 whereby the valve 46' will be closed, the valve 46 opened, and the switch 62 operated to energize the heating cartridge 20' and to de-energize the heating cartridge 20. This will cause vaporization to take place in the generator-absorber A' and absorption in the generator-absorber A, which will proceed as previously described.

The control bulbs 56 and 56' will function to operate alternately the generator-absorbers A, A' on the generating period and on the absorption period, as just described, until the temperature of the chamber 52 goes below a predetermined limit which may be substantially below the temperature in the food storage compartment. At this time the bulb 64 will operate to collapse the bellows 68 and operate to close the valve 72 and open the switch 74. This will operate to de-energize the generator-absorber which is then being heated and to stop the flow of cooling fluid in the indirect cooling circuit, both that flowing through the condenser and that flowing through the generator-absorber.

The liquid cooling medium in the annular heat exchange chamber of the generator-absorber which has been operating on the absorption cycle is soon vaporized due to the heat of absorption and will pass to the secondary condenser R where it will be condensed and the vapor lift action of the vapor rising through the tubes 34 or 34' as the case may be, will quickly empty the annular heat exchange vessel. As the valve 72 is now closed, the cooling medium condensed in the secondary condenser R and that flowing to the gas separation chamber S cannot return to the annular heat exchange chambers of either the generator-absorbers or the condensers. When the absorption of refrigerant vapor in the generator-absorber being cooled ceases, no more refrigerant will evaporate in the evaporator of that unit. Thereafter the temperature of the air in the food storage compartment and that of the chamber 52 will slowly rise until the control bulb 64 again acts to open the valve 72 and close the switch 74. The two units will then operate cyclically as previously described.

When one unit is operating on the generating period, the other is always operating on the evaporation-absorption period and substantially continuous refrigeration is being produced so that the chamber 52 and the food storage chamber are always maintained at their proper temperatures.

In intermittent absorption machines of the type using a solid absorbent such as strontium chloride the tube leaving the generator-absorber is always cool at the start of a generating period and some of the refrigerant vapor inevitably will be condensed in this conduit. If this condensed refrigerant should find its way back to the solid absorbent in the generator-absorber, it would quickly deteriorate the solid absorbent in the generator-absorber so as to render it inoperative. According to the above-described arrangement, this condensed refrigerant vapor cannot flow into the generator-absorber but must flow downwardly through the conduits 10, 10' into the condensers C, C' and thus be prevented from ever contacting the solid absorbent while in liquid form.

Figure 4:
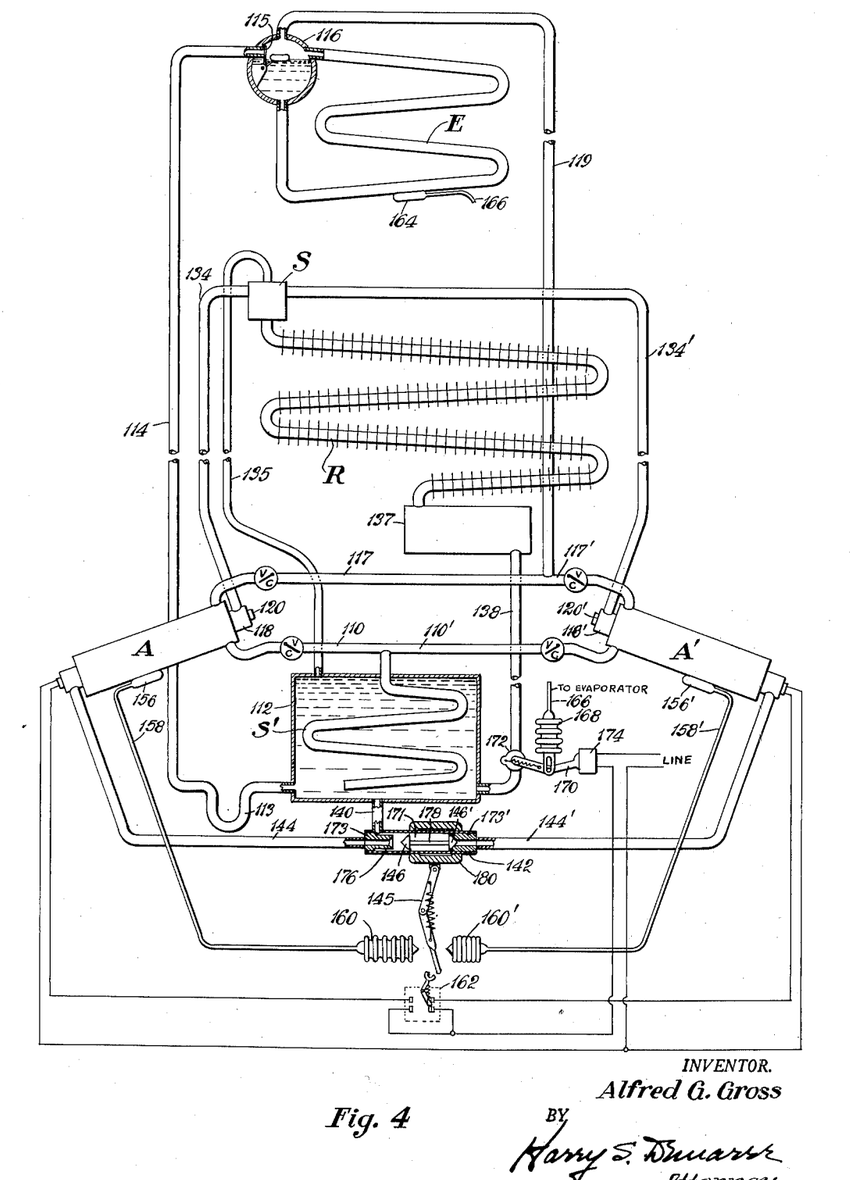
Figure 4 shows a second form of refrigerating apparatus according to this invention in which the indirect cooling circuit is in open communication with the interior of the refrigerating system.

The modification of the invention shown in Figure 4 includes all the advantages flowing from that disclosed in Figures 1, 2 and 3, with the additional advantage that the indirect cooling circuit is in open communication with the interior of the unit and a portion of the refrigerant itself is utilized to transfer the heat from the unit to the ultimate cooling medium such as the air. In addition, the unit of Figure 4 has but a single condenser and a single evaporator.

Referring to Figure 4 of the drawings, A, A' represent two generator-absorbers as in Figure 1, S' a single condenser and E a single evaporator. The absorbent-receiving chambers of the generator-absorbers A, A' are connected to the condenser S' by conduits 110, 110'. The condenser S' is in the form of a coiled conduit and is housed within the interior of a reservoir 112 forming part of the indirect cooling circuit as will be more particularly described hereinafter. The conduits 110, 110' have check valves marked cv which allow the flow of vapor from the absorber-receiving chamber of the generator-absorbers A, A' to the condenser S' but which prevents the reverse flow of any fluid. The coiled conduit forming the condenser S' is in open communication with the reservoir 112 at its bottom end. The bottom of the reservoir 112 is connected to the evaporator E by an upwardly extending conduit 114 which includes the trap 113. It will be noted that as in Figure 1 the condenser S' is located below the generator-absorbers A, A'.

The generator-absorbers A, A' of Figure 4 are constructed the same as in Figure 1 and include annular heat exchange vessels 118, 118' and heating cartridges 120, 120'.

In the receiving vessel 116 of the evaporator E is a float valve 115 which controls the flow of liquid refrigerant from the conduit 114 responsive to the level of liquid refrigerant in the vessel 116. The evaporator E of Figure 4 is substantially the same as one of the evaporators disclosed in Figure 1. The generator-absorbers A, A' are connected to the upper end of the receiving vessel 116 of the evaporator E by conduits 117, 117' and conduit 119. The conduits 117, 117' have check valves therein marked "cv" which will allow vapor to flow toward the absorbent-receiving chamber of the generator-absorber A, A' but will prevent the reverse flow of any fluid.

The upper end of each of the annular heat exchange chambers 118, 118' of the generator-absorbers A, A' is connected by conduits 134, 134' to a chamber S. The upper end of the reservoir 112 is also connected to the chamber S by a conduit 135. The secondary condenser R is connected at its upper end to the lower portion of the chamber S and at its lower end to a second reservoir 137. The reservoir 137 is connected to the bottom of the reservoir 112 by a conduit 138. From the lower end of the reservoir 112 a conduit 140 leads to the valve chamber 142. The valve chamber 142 is connected by conduits 144 and 144' to the lower end of the heat exchange vessels 118, 118'.

Thermostatic bulbs 156, 156' contact the outer surface of the generator-absorbers A, A' and are connected by capillary tubes 158, 158' to bellows 160, 160' which upon expansion and contraction are adapted to operate the snap acting device 145. As in Figure 1, the bulbs, bellows and connecting tubes contain a suitable vaporizable fluid so that the bellows will expand and contract upon variations in temperature of the generator-absorbers A, A'. A snap acting switch 162 of any well known construction is positioned to be actuated by snap acting device 145.

The valve chamber 142 forms a housing for a slidable valve 171 having ends 146, 146' which cooperate with valve seats 173, 173'. Upon reciprocation the valve element 171 cooperates with the seats 173, 173' to open or close the openings leading to the conduits 144, 144'. The conduit 140 leads to the interior of the valve chamber 142 near the left hand end thereof and the valve seat 173 has grooves 176 to allow fluids to pass along the sides of the seat member 173 whether valve element 171 is in seating engagement with valve seat member 173 or not. The valve element 171 has grooves 178 cut in the exterior thereof to allow fluids to pass from one end thereof to the other.

Slidably mounted on the exterior of the valve housing 142 is a permanent magnet 180, having north and south poles at the opposite ends thereof, which is adapted to be reciprocated to the right and to the left by the snap-acting device 145.

The valve chamber 142 is made of non-magnetic material such as certain types of stainless steel while the valve element 171 and the valve seat members 173 and 173' are made of magnetic material. The permanent magnet 180 is made of material obtainable on the open market under the trade name of "Alnico" which is an alloy of nickel, aluminum, chromium and iron in proper proportions. The valve element 171 and the permanent magnet 180 are made of such length that when the valve element 171 is moved either to the right or to the left, a circuit for magnetic lines of force is formed emanating from one end of the magnet 180, passing through the non-magnetic walls 142 into the valve seat members 173 or 173' as the case may be, through the valve element 171 and back to the other end of the magnet 180 again after passing through the non-magnetic walls of the chamber 142. In such construction the valve element 171 is held tightly against the seat by the magnetic lines of force regardless of whether it and the magnet 180 are moved to the right or to the left.

The liquid level in the indirect cooling circuit is preferably maintained at least as high as the reservoir 137. However, it will be noted under these circumstances that no liquid can enter the absorbent-receiving chambers of the generator-absorbers A, A' because of the check valves in the conduits 110, 110' and the fact that the remaining conduits of the system form upwardly extending loops so that the liquid in the indirect cooling circuit cannot contact with the absorbent in the absorbent-receiving chambers of the generator-absorbers A, A'.

A thermostatic bulb 164 is positioned in contact with the evaporator E and is responsive to the temperature of the evaporator. The bulb 164 is connected by a capillary tube 166 to a bellows 168. As in the modification of Figure 1 the bulb 164, the tube 166 and the bellows 168 contains a suitable vaporizable fluid so that the bellows 168 will expand and contract upon variations in temperature of the evaporator E. The bellows 168, upon expansion and contraction, is adapted to actuate a snap-acting device 170 which in turn operates a valve 172 in the conduit 138 and an electric switch 174.

As shown in Figure 4 the valve 172 is open and the switch 174 is closed. The switch 162 is in such position that electricity will be conducted to the heating cartridge 120' of the generator-absorber A' which will be heated. The bellows 160' is contracted and the bellows 160 is expanded as explained in connection with Figure 1. The snap acting device 145 will be positioned to the right, the valve 171 will be positioned to the right so its end 146' will be in contact with the seat 173' to stop the flow of fluid through conduit 144' and its end 146 will be removed from contact with the seat 173 to allow flow of fluid through conduit 144.

The heating of the generator-absorber A' will drive refrigerant vapor from the solid absorbent contained therein and this vapor will pass by the conduit 110' to the condenser S' after having passed through the check valve in the conduit 110'. The cool liquid refrigerant in the reservoir 112 will take up the heat of condensation of the refrigerant vapor in the condenser S' whereby the vapor will be condensed and flow into the reservoir 112 near the bottom. Any vapor generated from the liquid in the reservoir 112 by the heat of condensation will form vapor bubbles and raise refrigerant upwardly through the conduit 135 by vapor lift action. The vapor and liquid will flow through the chamber S, the secondary condenser R and return to the reservoir 112 through reservoir 137 and conduit 138 for further cooling action in due course. The rise in pressure caused by the heating of the generator-absorber A' in the reservoir 112 will cause some of the liquid refrigerant in the reservoir 112 to be forced upwardly through the conduit 114 and, if the liquid level in the receiving vessel 116 of the evaporator E is below a certain level, this refrigerant liquid will enter the receiving vessel 116 past the float valve 115 therein until the rise in level in the receiving vessel 116 closes the valve 115.

As explained in connection with Figure 1, the liquid in the heat exchange chamber 118' of the generator-absorber A will quickly vaporize and flow by the conduit 134' to the chamber S to be recondensed in the secondary condenser R. This liquid cannot return to the chamber 118' at this time because the end 146' of the valve 171 is positioned against its seat 173'.

In the meantime as explained in connection with Figure 1, absorption of refrigerant vapor is taking place in the generator-absorber A.

When the refrigerant in the generator-absorber A' has all been driven from the solid absorbent therein the fluid in the bulb 156' will expand as explained in connection with Figure 1 and operate the bellows 160' to shift the snap acting device to the left which will operate the switch 162 to de-energize the heating element 120' and to energize the heating element 120. At the same time the permanent magnet 180 is moved to the left and the magnetic lines of force will cause the valve element 171 to move therewith and force the end 146 of the valve element 171 against the magnetic seat 173 to close the opening to the conduit 144 and unseat the end 146' to allow flow of fluid through conduit 144'.

This will cause the liquid refrigerant in the indirect cooling circuit to be quickly dumped into the heat exchange chamber 118' of the generator-absorber A' to quickly cool the same. Under these conditions the indirect cooling fluid enters the valve chamber 142 by the conduit 140, passes through the grooves 176 in the valve seat member 173 past the valve 171 by grooves 178, through the opening in the seat 173', through the conduit 144' and thence into the heat exchange chamber 118'.

As explained in connection with Figure 1, the liquid that was dumped into the heat exchange chamber 118' will be quickly vaporized to cool the generator-absorber A' and the vapor thus formed will act as a vapor lift pump to circulate positively liquid upwardly through the conduit 134' to the chamber S. The liquid and the vapor will pass from the chamber S into the secondary condenser R where the vapor will be condensed and the liquid cooled and returned to the heat exchange vessel 118' by way of reservoir 137, conduit 138, reservoir 112, conduit 140, valve chamber 142 and conduit 144'.

By the time the generator-absorber A' has absorbed all the refrigerant of which it is capable the generator-absorber A will be depleted of refrigerant and the control bulb 156 will operate as previously described to shift the snap acting device 145 to the right which will operate the switch 162 to de-energize the generator-absorber A and to energize the generator-absorber A'. At the same time the magnet 180 will be shifted to the right, the magnetic circuit will be broken by the movement of the left hand end of the magnet from directly over the valve seat 173 and quickly move the valve 171 to the right to establish another magnetic circuit and hold the end 146' of the valve 171 against the valve seat member 173' to close the opening to the conduit 144'. Under these conditions the indirect cooling fluid will enter the valve chamber 142 by conduit 140, enter the opening in the valve seat member 173 and thus flow into the conduit 144.

The generator-absorbers A, A' will then operate cyclically until the temperature of the evaporator E contracts the fluid in the bulb 164 to operate the control bellows 168 as described in connection with Figure 1. The generator-absorber then operating on the absorption period will be quickly emptied of cooling medium as described in connection with Figure 1 and the evaporator temperature will slowly rise until the control again operates to open the valve 172 and close the switch 174 to start the cycling operation as previously described. During the absorption period of the generator-absorbers A, A' the lowering of the vapor pressure causes refrigerant vapor to be drawn from the receiver 116, through the conduit 119 and conduits 117 or 117' as the case may be into the generator-absorbers A or A', past the check valve in the conduit 117 or 117'. During the generating period of operation of the generator-absorbers A, A' the check valves in the conduits 117, 117' prevent refrigerant vapor from passing to the evaporator E.

The above-described refrigerating system provides an indirect cooling circuit having a single heat rejecting element for two intermittently operating absorption refrigerating units having a single evaporator and a single condenser in which the indirect cooling circuit is in open communication with the interior of the units and in which a portion of the refrigerant is utilized for cooling both the condenser and the generator-absorbers of the units but during the absorption period of the operation of the generator-absorbers the liquid refrigerant in the indirect cooling circuit is shielded from the low vapor pressure in the generator-absorbers so as to prevent the evaporation of the liquid in the indirect cooling circuit rather than the liquid refrigerant in the evaporator.

While I have shown and described but a number of modifications of my invention, it is to be understood that these modifications are to be taken as illustrative only and not in a limiting sense. I do not wish to be limited to the particular structure shown and described, but to include all equivalent variations thereof except as limited by the scope of the claims.

I claim:

1. An absorption refrigerating apparatus comprising, an intermittent absorption refrigerating apparatus having two generator-absorbers each operating alternately as a generator and as an absorber and an indirect cooling system for said apparatus in open communication therewith and utilizing a portion of the refrigerant for transferring heat from said apparatus to the ultimate cooling medium.

2. An absorption refrigerating apparatus comprising, an intermittent absorption refrigerating apparatus having two generator-absorbers each operating alternately as a generator and as an absorber and an indirect cooling system for said apparatus in open communication therewith and utilizing a portion of the refrigerant for transferring heat from said apparatus to the ultimate cooling medium, said apparatus and system being so constructed and arranged that liquid medium contained in said cooling system is not subjected to the lowered vapor pressures caused when either generator-absorber is operating as an absorber.

3. An absorption refrigerating apparatus comprising an intermittent absorption refrigerating apparatus having two generator-absorbers each operating alternately as a generator and as an absorber, an indirect cooling system for said apparatus in open communication therewith and utilizing a portion of the refrigerant for transferring heat from said apparatus to the ultimate cooling medium and means for controlling the flow of refrigerant in said cooling system in unison with the operation of said generator-absorbers.

4. An absorption refrigerating apparatus comprising an intermittent absorption refrigerating apparatus having two generator-absorbers each operating alternately as a generator and as an absorber and an indirect cooling system for said apparatus in open communication therewith and utilizing a portion of the refrigerant for transferring heat from said apparatus to the ultimate cooling medium, said system having a single heat rejecting element for transferring heat from the heat rejecting parts of said apparatus to the ultimate cooling medium.

5. An absorption refrigerating apparatus comprising, an intermittent absorption refrigerating apparatus having two generator-absorbers each operating alternately as a generator and as an absorber and being charged with a solid absorbent subject to deterioration if contacted with refrigerant in liquid form, condensing means, conduits connecting said generator-absorbers to said condensing means, said condensing means being positioned at a level below the point of connection of said conduits to said generator-absorbers and an indirect cooling system for the generator-absorbers and condensing means in open communication therewith and utilizing a portion of the refrigerant for transferring heat from said generator-absorbers and condensing means to the ultimate cooling medium.

6. An absorption refrigerating apparatus comprising, an intermittent absorption refrigerating apparatus having two generator-absorbers each operating alternately as a generator and as an absorber and being charged with a solid absorbent subject to deterioration if contacted with refrigerant in liquid form, condensing means, conduits connecting said generator-absorbers to said condensing means, said condensing means being positioned at a level below the point of connection of said conduits to said generator-absorbers and an indirect cooling system for the generator-absorbers and condensing means in open communication therewith and utilizing a portion of the refrigerant for transferring heat from said generator-absorbers and condensing means to the ultimate cooling medium, said system having a single heat rejecting element for transferring heat from said generator-absorbers and condensing means to the ultimate cooling medium and being positioned above said generator-absorbers and condensing means.

7. An absorption refrigerating apparatus comprising, an intermittent absorption refrigerating apparatus having two generator-absorbers each operating alternately as a generator and as an absorber and being charged with a solid absorbent subject to deterioration if contacted with refrigerant in liquid form, condensing means, conduits connecting said generator-absorbers to said condensing means, said condensing means being positioned at a level below the point of connection of said conduits to said generator-absorbers and an indirect cooling system for the generator-absorbers and condensing means in open communication therewith and utilizing a portion of the refrigerant for transferring heat from said generator-absorbers and condensing means to the ultimate cooling medium, said apparatus and system being so constructed and arranged that liquid refrigerant in said system is not subjected to the lowered vapor pressures caused when either generator-absorber is operating on the absorption period.

8. A refrigerating apparatus comprising, intermittent refrigerating apparatus having two generator-absorbers each operating alternately as a generator and as an absorber and having condensing means, conduits connecting said generator-absorbers to said condensing means, said condensing means being positioned at a level below the point of connection of said conduits to said generator-absorbers and an indirect cooling circuit for the condensing means and generator-absorbers, said circuit including heat rejecting elements in heat exchange relation with the condensing means and generator-absorbers and a single air-cooled heat rejecting element connected in circuit with said heat rejecting elements and said cooling circuit being in open communication with the interior of said apparatus.

9. In combination, a domestic refrigerator cabinet having a food storage compartment, an apparatus compartment below said food storage compartment and a vertically extending air flue extending upwardly along one side of said food storage compartment, an intermittent absorption refrigerating apparatus having two generator-absorbers operating alternately on the generation and absorption periods associated with said cabinet, said generator-absorbers being positioned in said apparatus compartment, a condenser positioned in said apparatus compartment below and connected by conduits to each of said generator-absorbers and an evaporator positioned in said food storage compartment and connected to receive liquid refrigerant from said condensers and an indirect cooling system for said apparatus comprising a heat exchange element in heat exchange relation with each of said condensers and said generator-absorbers and a single heat rejecting member connected by conduits with said heat exchange element and being positioned in said vertical air flue.

10. In combination, a domestic refrigerator cabinet having a food storage compartment, an apparatus compartment below said food storage compartment, and a vertical air flue extending upwardly along one side of said food storage compartment, an intermittent absorption refrigerating apparatus having two generator-absorbers operating alternately on the generation and absorption periods associated with said cabinet, said generator-absorbers being positioned in side by side relationship in said apparatus compartment, at least one condenser connected to receive refrigerant vapor from said generator-absorbers and positioned in said apparatus compartment below the level of said generator-absorbers and an indirect cooling circuit for said apparatus comprising heat exchange elements in heat exchange relation with said generator-absorbers and condenser, connected by conduits to a heat rejecting member in said vertical air flue.

11. In combination, a domestic refrigerator cabinet having a food storage compartment, an apparatus compartment below said food storage compartment, a vertical air flue extending upwardly along one side of said food storage compartment, an intermittent absorption refrigerating apparatus having two generator-absorbers operating alternately on the generation and absorption periods associated with said cabinet, said generator-absorbers being positioned in side by side relationship in said apparatus compartment, at least one condenser connected to receive refrigerant vapor from said generator-absorbers and positioned in said apparatus compartment below the level of said generator-absorbers and an indirect cooling circuit for said apparatus comprising heat exchange elements in heat exchange relation with said generator-absorbers and said condenser connected by conduits to a heat rejecting member in said vertical air flue, said heat exchange elements, heat rejecting member and conduits being so constructed and arranged that vapor formed in said heat exchange elements raises cooling fluid to the top of said heat rejecting member.

12. An absorption refrigerating apparatus comprising an intermittent absorption refrigerating apparatus having two generator-absorbers operating alternately on generation and absorption periods, condensing means connected to receive refrigerant vapor from said generator-absorbers and positioned at a level below said generator-absorbers and an indirect cooling circuit for said generator-absorbers and said condensing means, said circuit comprising heat exchange elements in heat exchange relation with said generator-absorbers and said condensing means, vertically extending conduits leading upwardly from said heat exchange elements to the top of a secondary condenser positioned at a level above said heat exchange elements, and said secondary condenser being connected by return conduits to said heat exchange elements.

13. An absorption refrigerating apparatus comprising an intermittent absorption refrigerating apparatus having two generator-absorbers each operating alternately as a generator and as an absorber, condensing means connected to receive refrigerant vapor from said generator-absorbers and positioned at a level below said generator-absorbers, and an indirect cooling circuit for said generator-absorbers and said condensing means, said circuit comprising heat exchange elements in heat exchange relation with said generator-absorbers and said condensing means, vertically extending conduits leading upwardly from said heat exchange elements to the top of a secondary condenser positioned at a level above said heat exchange elements, and said secondary condenser being connected by return conduits to said heat exchange elements, and control means for alternately operating each generator-absorber as a generator and then as an absorber as the other is operating as an absorber and then as a generator, said control means also being constructed to control the flow of cooling fluid to the heat exchange elements in heat exchange relation with said generator-absorbers.

14. An absorption refrigerating apparatus comprising an intermittent absorption refrigerating apparatus having two generator-absorbers each operating alternately as a generator and as an absorber, condensing means connected to receive refrigerant vapor from said generator-absorbers and positioned at a level below said generator-absorbers, and an indirect cooling circuit for said generator-absorbers and said condensing means, said circuits comprising heat exchange elements in heat exchange relation with said generator-absorbers and said condensing means, vertically extending conduits leading upwardly from said heat exchange elements to the top of a secondary condenser positioned at a level above said heat exchange elements, and said secondary condenser being connected by return conduits to said heat exchange elements, control means for alternately operating each generator-absorber as a generator and then as an absorber as the other is operating as an absorber and then as a generator, said control means also being constructed to control the flow of cooling fluid to the heat exchange elements in heat exchange relation with said generator-absorbers and a second control means for controlling the flow of cooling fluid to all of said heat exchange elements and the supply of energy to said apparatus.

15. An absorption refrigerating apparatus comprising two generator-absorbers each operating alternately as a generator and as an absorber, a single primary condenser, conduits connecting said generator-absorbers to said primary condenser, the connection between said conduits and said primary condenser being located at a lower level than said generator-absorbers, a single evaporator communicating with the lower end of said condenser and connected to each generator-absorber by separate conduit means and an indirect cooling circuit for said apparatus comprising a heat exchange element in heat exchange relation with each generator-absorber, one end of each of said heat exchange elements being connected by vertically extending conduits to a secondary condenser positioned above said generator-absorbers, a liquid reservoir surrounding said primary condenser, said reservoir being connected by a vertically extending conduit to said secondary condenser and by other conduits to the other end of each of said heat exchange elements.

16. An absorption refrigerating apparatus comprising two generator-absorbers each operating alternately as a generator and as an absorber, a single primary condenser conduits connecting said generator-absorbers to said primary condenser, the connection between said conduits and said primary condenser being located at a lower level than said generator-absorbers, a single evaporator communicating with the lower end of said condenser and connected to each generator-absorber by separate conduit means and an indirect cooling circuit for said apparatus comprising a heat exchange element in heat exchange relation with each generator-absorber, one end of each of said heat exchange elements being connected by vertically extending conduits to a secondary condenser positioned above said generator-absorbers, a liquid reservoir surrounding said primary condenser, said reservoir being connected by a vertically extending conduit to said secondary condenser and by other conduits to the other end of each of said heat exchange elements, said primary condenser being in open communication with said reservoir.

17. An absorption refrigerating apparatus comprising two generator-absorbers each operating alternately as a generator and as an absorber, a single primary condenser, conduits connecting said generator-absorbers to said primary condenser, the connection between said conduits and said primary condenser being located at a lower level than said generator-absorbers, a single evaporator communicating with the lower end of said condenser and connected to each generator-absorber by separate conduit means and an indirect cooling circuit for said apparatus comprising a heat exchange element in heat exchange relation with each generator-absorber, one end of each heat exchange element being connected by a vertically extending conduit to a secondary condenser positioned at a level above said generator-absorbers, a liquid reservoir surrounding said primary condenser, said reservoir being connected by a vertically extending conduit to said secondary condenser and by other conduits to the other end of each of said heat exchange elements, said heat exchange elements and the conduits connecting them to said secondary condenser being so constructed and arranged that vapor formed in said heat exchange elements raises liquid cooling medium to said secondary condenser.

18. An absorption refrigerating apparatus comprising two generator-absorbers each operating alternately as a generator and as an absorber, a single primary condenser, conduits connecting said generator-absorbers to said primary condenser, the connection between said conduits and said primary condenser being located at a lower level than said generator-absorbers, a single evaporator communicating with the lower end of said condenser and connected to each generator-absorber by separate conduit means and an indirect cooling circuit for said apparatus comprising a heat exchange element in heat exchange relationship with each generator-absorber, one end of each of said heat exchange elements being connected by vertically extending conduits to a secondary condenser positioned above said generator-absorbers, a liquid reservoir surrounding said primary condenser, said reservoir being connected by a vertically extending conduit to said secondary condenser and by other conduits to the other end of each of said heat exchange elements and control means for controlling the flow of cooling medium from said reservoir to said heat exchange elements.

19. An absorption refrigerating apparatus comprising, two generator-absorbers each operating alternately as a generator and as an absorber, a single primary condenser, conduits connecting said generator-absorbers to said primary condenser, the connection between said conduits and said primary condenser being located at a level below said generator-absorbers, the upper end of said primary condenser being connected to said generator-absorbers by valved conduits constructed to provide for the flow of vapor from said generator-absorbers to said primary condenser but to prevent the reverse flow of fluid, a single evaporator positioned at a level above the generator-absorbers, said evaporator being connected by a valved conduit to the lower end of said condenser constructed to provide for the flow of liquid refrigerant from said primary condenser to said evaporator responsive to the liquid level in said evaporator, said evaporator also being connected to each generator-absorber by valved conduits constructed to provide for the flow of vapor from said evaporator to said generator-absorbers but to prevent the reverse flow of fluid.

20. An absorption refrigerating apparatus comprising, two generator-absorbers each operating alternately as a generator and as an absorber, a single primary condenser, conduits connecting said generator-absorbers to said primary condenser, the connection between said conduits and said primary condenser being located at a level below said generator-absorbers, the upper end of said primary condenser being connected to each of said generator-absorbers by a valved conduit constructed to provide for the flow of vapor from said generator-absorbers to said primary condenser but to prevent the reverse flow of fluids, a single evaporator positioned at a level above said generator-absorbers, said evaporator being connected by a valved conduit to the lower end of said condenser constructed to provide for the flow of liquid refrigerant from said primary condenser to said evaporator responsive to the liquid level in said evaporator, said evaporator being connected to each of said generator-absorbers by valved conduits constructed to provide for the flow of vapor from said evaporator to said generator-absorbers but to prevent a reverse flow of fluid, and an indirect cooling system for said condenser and said generator-absorbers comprising a liquid reservoir surrounding said primary condenser, heat exchange elements in heat exchange relation with each generator-absorber, and a secondary condenser, said secondary condenser being positioned above said heat exchange elements and said reservoir, the upper end of said secondary condenser being connected to one end of each of said heat exchange elements and said reservoir by vapor lift conduits and the opposite end of said secondary condenser being connected to said reservoir, and said reservoir being connected by valved conduits to the opposite end of said heat exchange elements.

21. In combination, an absorption refrigerating apparatus comprising a generator-absorber and a condenser and a secondary cooling circuit for said apparatus, said circuit being in open communicating with said apparatus and utilizing a portion of the refrigerant as the auxiliary cooling medium.

ALFRED G. GROSS.

REFERENCES CITED

The following references are of record in the file of this patent:

UNITED STATES PATENTS

| Number | Name | Date |
| --- | --- | --- |
| 1,854,778 | Boving | Apr. 19, 1932 |
| 2,093,552 | Elfving et al. | Sept. 21, 1937 |
| 2,287,172 | Harrison et al. | June 23, 1942 |
| 2,446,636 | Coons | Aug. 10, 1948 |